United States Patent
Beyabani et al.

(10) Patent No.: US 9,113,040 B2
(45) Date of Patent: Aug. 18, 2015

(54) SYSTEM FOR UP-SELLING CONTENT DURING PERIODS OF LIKELY VIEWER DISINTEREST

(75) Inventors: Syed Zafar Beyabani, Irving, TX (US); Numaira Siddiqa Tetwale, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 842 days.

(21) Appl. No.: 12/164,481

(22) Filed: Jun. 30, 2008

(65) Prior Publication Data

US 2009/0328085 A1    Dec. 31, 2009

(51) Int. Cl.
*H04N 7/173* (2011.01)
*G06Q 30/02* (2012.01)
*H04N 21/258* (2011.01)
*H04N 21/442* (2011.01)
*H04N 21/658* (2011.01)

(52) U.S. Cl.
CPC ........... *H04N 7/17318* (2013.01); *G06Q 30/02* (2013.01); *H04N 21/25891* (2013.01); *H04N 21/44222* (2013.01); *H04N 21/6582* (2013.01)

(58) Field of Classification Search
CPC .............. H04N 21/25891; H04N 21/44222; H04N 21/6582
USPC ................. 725/9–21, 32–36; 705/14.4–14.73
See application file for complete search history.

(56) References Cited

U.S. PATENT DOCUMENTS

| | | | |
|---|---|---|---|
| 7,185,353 B2 * | 2/2007 | Schlack | 725/35 |
| 7,185,355 B1 * | 2/2007 | Ellis et al. | 725/46 |
| 8,387,093 B2 * | 2/2013 | Danker et al. | 725/46 |
| 2003/0051245 A1 * | 3/2003 | Klopfenstein | 725/46 |
| 2003/0101451 A1 * | 5/2003 | Bentolila et al. | 725/34 |
| 2003/0217369 A1 * | 11/2003 | Heredia | 725/152 |
| 2004/0088730 A1 | 5/2004 | Gopalan et al. | |
| 2005/0022239 A1 * | 1/2005 | Meuleman | 725/46 |
| 2005/0210498 A1 * | 9/2005 | Scott et al. | 725/8 |
| 2007/0078849 A1 * | 4/2007 | Slothouber | 707/5 |
| 2007/0277218 A1 * | 11/2007 | Borden | 725/135 |
| 2008/0013920 A1 | 1/2008 | Plourde et al. | |
| 2008/0098423 A1 * | 4/2008 | Malik | 725/34 |

FOREIGN PATENT DOCUMENTS

CN    101188736    5/2008

* cited by examiner

*Primary Examiner* — Hunter B Lonsberry
*Assistant Examiner* — Patrick A Ryan (57) ABSTRACT

A system for up-selling content during periods of likely viewer disinterest may include a content delivery network configured to provide media content and at least one choice of alternative content, a content viewing device, and a content processing device for interfacing the viewing device with the content delivery network. The content processing device may be configured to detect likely viewer disinterest in media content, prompt the selection of alternative content, and selectively replace the media content with the alternative content upon viewer selection. Additionally, methods for estimating a degree of likely viewer disinterest and discounting the offering price of the alternative content options are implemented by the system.

20 Claims, 5 Drawing Sheets

SYSTEM FOR UP-SELLING CONTENT DURING PERIODS OF LIKELY VIEWER DISINTEREST

BACKGROUND

Subscriber systems, such as a cable television system and the like, may provide media content to a viewing customer according to a subscription. In addition to the standard subscription based content (e.g., scheduled network programming), specialty content may be available to the viewing customer. Specialty content may include any content that falls outside of the content available through the standard subscription, and may provide additional revenue for the subscriber system. For example, pay-per-view and pay-per-use movies, videos, music, games, etc. may be available to the viewing customer. Specialty content may further include enhancements to the subscription of the viewing customer, such as premium content channels. Additionally, specialty content may further include advertiser supported content.

Typically, the goal of any subscriber system includes maximizing revenue from subscribers while maintaining high levels of customer service and satisfaction. However, due to the remote nature of the content distribution network and the variable times that a customer may choose to receive content, there may only be limited opportunities to sell content to a viewing customer. For example, the customer may only interact with a customer service representative or salesperson at the time of subscribing or modifying a subscription. Accordingly, subscriber systems may lack the ability to up-sell specialty content to the viewing customer.

DETAILED DESCRIPTION

Exemplary illustrations of a system for up-selling content during periods of likely viewer disinterest are described below. In the interest of clarity, not all features of an actual implementation are described in this specification. It will of course be appreciated that in the development of any such actual illustration, numerous implementation-specific decisions must be made to achieve the specific goals of the developer, such as compliance with system-related and business-related constraints that will vary from one implementation to another. Moreover, it will be appreciated that such a development effort might be complex and time-consuming, but would nevertheless be a routine undertaking for those having the benefit of this disclosure.

Referring now to the drawings wherein like numerals indicate like or corresponding parts throughout the several views, exemplary illustrations are provided.

Figure 1:
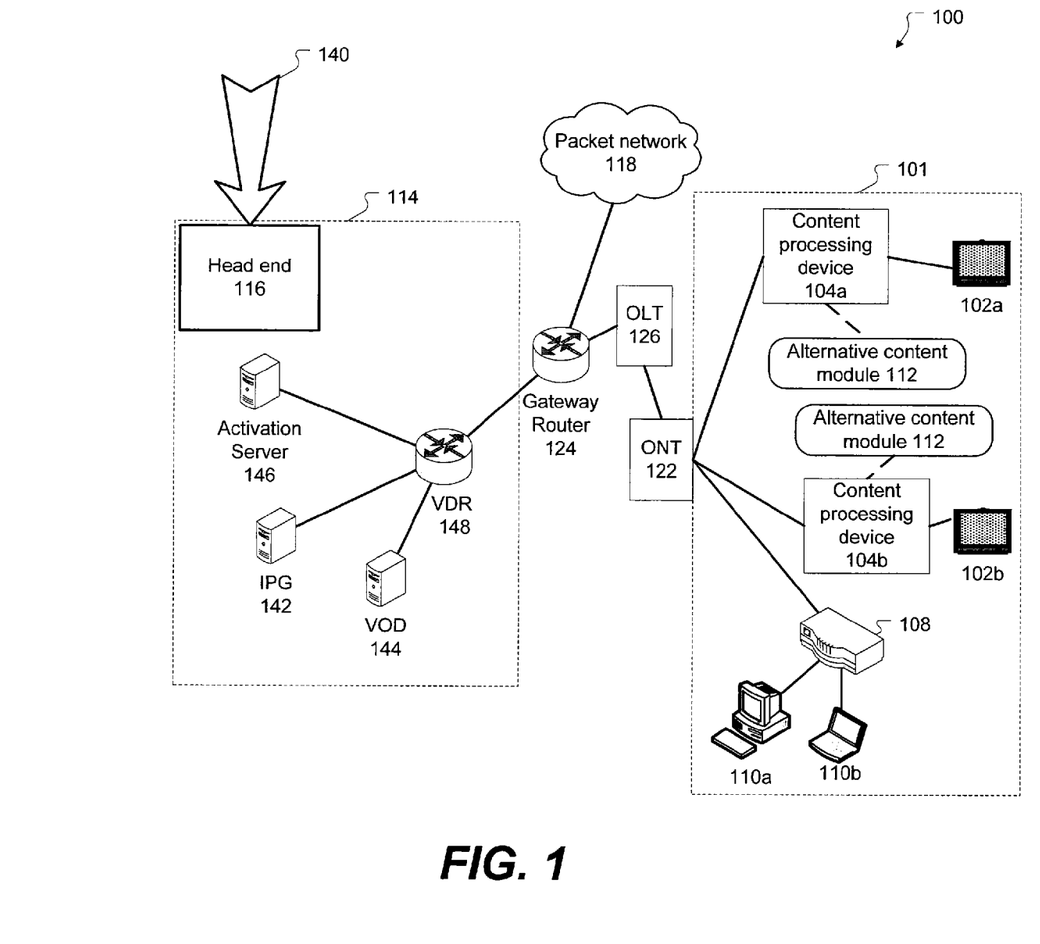
FIG. 1 is a system diagram of a system for up-selling content during periods of likely viewer disinterest.

FIG. 1 illustrates an exemplary system 100 for up-selling content during periods of likely viewer disinterest. Details of the elements depicted in the figures are included following a brief functional overview of the system 100. Important considerations in any potential sales transaction include both the offering price and the time of offering. Preferably, the time of offering should correlate with a need of the purchaser. Moreover, the proposed price must be agreeable. In the context of a subscriber system, selling specialty content can be quite challenging, particularly when the potential customer has already made a purchase, e.g., a base subscription to access the subscriber system. Accordingly, the system 100 may implement a process for up-selling content during periods of likely viewer disinterest. The process may include detecting likely viewer disinterest in media content, prompting the viewer to select alternative content, and replacing the media content with the alternative content upon selection by the viewer. To offer the alternative content at a price that entices the viewer to make a purchase, the degree of likely viewer disinterest may be estimated. The price of the alternative content may be discounted based on the estimated degree of likely viewer disinterest. Thus, the system 100 may generate revenue through up-selling content that has been offered at a time and price specifically tailored to the existence and degree of likely viewer disinterest.

Turning now to FIG. 1, an exemplary system 100 for up-selling content during periods of likely viewer disinterest is illustrated. The system 100 generally includes a customer premises network 101 in which media content 140 (e.g., media programming such as interactive or streamed media content), including any one or more of text, images, audio, video, multimedia, etc., may be provided to a media playback device 102 through a content processing device 104 attached to a customer premises network 101. The customer premises network 101 may receive media content 140 from a head end 116 via a media distribution network 114.

The customer premises network 101 may encompass one or more devices within a customer premises such as one or more content processing devices 104a-b. The content processing device 104 may be a set top box (STB) or similar device for receiving a media signal from a network and for providing media content programming, e.g., audio, video, interactive content, etc., to a media playback device 102. The content processing device 104 may be controlled by a user through any control mechanism, e.g., a remote control (not shown), thereby facilitating the selection and playing of content 140 through the media playback device 102. A control mechanism may include numeric keys for selecting channels of video programming, as well as other keys for making selections and requests according to menus displayed on the media playback device 102, in addition to arrow keys and the like for selecting channels and items in a menu, changing volume levels, etc. An example of the content processing device 104 is set top box model number QIP6400 made by Motorola, Inc. of Schaumburg, Ill.

An alternative content module 112 may include software instructions, or the like, for controlling at least some aspects of the content processing device 104. As illustrated, the alternative content module 112 may be a software component implemented by the content processing device 104. However, in another exemplary approach (not shown), the alternative content module 112 may be implemented in a processing component of the media distribution network 114. The latency and overall performance of the network 114 may favor an implementation of the alternative content module 112 by the content processing device 104. The alternative content module 112 may be able to detect likely viewer disinterest in media content, prompt the viewer to select alternative content, and replace the media content 140 with alternative content upon selection by the viewer. Additionally, the alternative content module 112 may implement processes for estimating a degree of likely viewer disinterest or discounting the offering price of the alternative content options.

A router 108 may establish and operate, or at least connect to, a network such as a home network or local area network (LAN), and may route certain communications within customer premises network 101. The router 108 may provide connections to one or more computing devices 110. For example the computing devices 110 may be connected to the router 108 using a wireless connection, a network cable such as a "Cat5" cable, or the like. Further, the computing devices 110 are each uniquely addressable by the router 108 according to a networking protocol. For example, in one exemplary approach, Dynamic Host Configuration Protocol (DHCP) in combination with Network Address Translation (NAT) may dynamically assign Internet Protocol (IP) addresses to computing devices 110. In one exemplary approach, the assigned IP addresses may only be accessible to devices such as devices 110 that are part of the customer premises network 101 via the router 108.

The media playback devices 102a, 102b may include a variety of equipment alone or in combination, such as a video receiver, including a conventional television or a hi-definition television (HDTV), audio equipment including an amplifier and speakers, or devices that incorporate the capability to simultaneously or near simultaneously process different types of media content such as video, audio or text data, etc. The media playback device 102 may be connected to, and receive media content from, the content processing device 104.

In the illustrated exemplary system 100, fiber optic cable may be used to provide different data streams including at least one data stream representing media content 140 to customer premises network 101. An alternative data stream may be directed to router 108 for consumption by one or more devices 110, the data stream also potentially including media content 140, and optionally incorporating one or more of the features discussed below.

An optical line terminal (OLT) 126 may serve as a terminus for an optical network or an optical line. The OLT 126 may provide data, including media content 140, to one or more optical network terminals (ONTs) 122. The ONT 122 is generally situated adjacent to a customer premises, for the purpose of providing data received over an optical line to customer premises network 101, including content processing device 104. The ONT 122 may further bridge the network connection to a coaxial cable based network within the customer premises.

A gateway router 124 allows content processing device 104 to access the media distribution network 114 as well as a packet network 118, e.g. the Internet. By communicating with router 124, content processing device 104 is able to obtain a network address such as an internet protocol (IP) address, thereby enabling content processing device 104 to make requests to and to receive data from, an IPG server 142, and VOD server 144. The gateway router 124 may interconnect the customer premises network 101 with the media distribution network 114, as well as with the packet network 118. Accordingly, FIG. 1 illustrates a hybrid network system 100 in which media content 140 is transported over media distribution network 114 and alternative data transported over the packet network 118, both data streams being received by customer premises network 101 through a fiber optic line. However, it should be understood that other approaches are envisioned in which the content processing device 104 receives both data by way of media other than fiber optic cables to customer premises network 101. Further, under some exemplary approaches data transmitted and received by way of packet network 118 may also be considered media content 140 and incorporate one or more of the features discussed below with respect to media distribution network 114.

In an exemplary approach media distribution network 114 is a network for delivering media content 140 to the customer premises network 101. For example, the network 114 may include hardware and software for providing media content via coaxial cable and/or fiber optic cable, and network equipment, e.g., routers, switches, etc., as described further below. The media content 140 may be provided to the media distribution network 114 from a head end 116, which collects, aggregates, formats, and encodes the content according to the requirements of the media distribution network 114.

Various elements may be included as part of media distribution network 114 to provide media or other information to content processing device 104. A video distribution router (VDR) 148 may provide network connectivity to the elements of the media distribution network 114, and may further connect with the gateway router 124. For example, an interactive program guide (IPG) server 142 may selectively communicate through routers 124, 148 to provide an interactive program guide to the content processing device 104. A video on demand (VOD) server 144, for providing telecommunications customers with video content "on demand," may also be provided to selectively communicate with content processing device 104, generally via media distribution network 114. Additionally, an activation server 146 may be provided to generally authorize and provision content processing device 104. For example, entitlement management data (EMM) may flow from activation server 146 when content processing device 104 is initially set up or placed in communication with system 100. EMM data may be provided by a service provider to authorize certain video content, e.g., subscriptions or packages of channels, to be decoded by content processing device 104, thereby generally preventing access from an unauthorized device. The IPG server 142, VOD server 144, and activation server 146 may selectively communicate with content processing device 104 via Video Distribution Router (VDR) 148, which links servers 142, 144, 146 with media distribution network 114.

The media distribution network 114 and the packet network 118 are generally Internet protocol (IP) networks. As such, networks 114 and 118 generally use one or more inter-networking protocols for transporting data, such as user datagram protocol (UDP), transport control protocol (TCP), hypertext transfer protocol (HTTP), etc. Further, networks 114 and 118 may include a variety of networks such as a wide area network (WAN), e.g., the Internet, a local area network (LAN), etc. The networks 114 and 118 may be used to transport a variety of data, including multimedia data such as audio data and video data. Accordingly, it is to be understood that other approaches are envisioned in which networks 114 and 118 are in fact combined into a single network, or in which media distribution network 114 is simply omitted, wherein the packet network 118 is used to provide media content 140 to content processing device 104.

Figure 2:
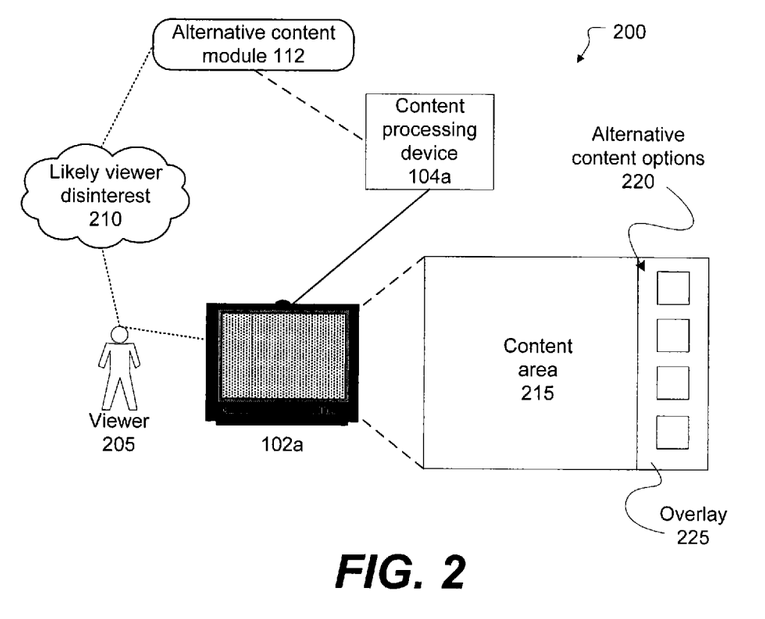
FIG. 2 is a system diagram of the display of exemplary content options.

FIG. 2 presents some of the components from the customer premises network 101 and further illustrates potential exemplary interactions between a viewer 205 and the alternative content module 112. Specifically, the alternative content module 112 may analyze the content being presented in a content area 215 of the media playback device 102 to detect likely viewer disinterest 210. The content itself, characteristics thereof, as well as the source of the content may influence the level or degree of likely viewer disinterest 210. For example, content may be determined to be a class of content likely to cause or demonstrate likely viewer disinterest 210, such as advertising content, programming guide content, rapid review content, non-preferred content, etc.

Advertising content may include promotional media content that interrupt and separate desired media content 140 in the form of scheduled programming content. The presence of advertisement content may be used to detect likely viewer disinterest 210 because, typically, the viewer 205 is interested in the requested media content and not the advertising content presented during programming breaks.

Programming guide content may include specialized channels or display modes for viewing the programming schedule or listings. The presence of programming guide content may be used to detect likely viewer disinterest 210 because the viewer 205 is likely searching for media content of interest.

Rapid review content may be identified from frequent channel or content source changes. (e.g., moving between channels, pre-recorded content or on-demand content). Channel changing, or so-called flipping or surfing, as well as changing among content sources may be used to detect likely viewer disinterest 210 because, like programming guide content, the viewer 205 is likely searching for content of interest.

The identification of content as non-preferred content may be explicitly made by the viewer 205. For example, the viewer 205 may maintain list of non-preferred content. By its very nature, non-preferred content may be used to detect likely viewer disinterest 210 because by being added to the list, the viewer 205 has made their disinterest explicitly clear. Techniques for classifying content and thereby detecting likely viewer disinterest 210 are discussed in more detail below with respect to FIGS. 4A-C.

Upon detection, the alternative content module 112 may instruct the content processing device 104 to present at least one alternative content option 220 in an overlay 225 of the content area 210. The overlay 225 may provide a graphical user interface that is controllable by the viewer 205 through use of a remote control input device (not shown). For example, the alternative content options 220 may be presented as selectable objects in the overlay area 225. In one exemplary approach, the overlay may be removed after a set period of time if the viewer 205 fails to make a selection. However, in another exemplary approach, the overlay area 225 may be continuously displayed so long as likely viewer disinterest 210 is detected.

The alternative content module 112 may further prompt the viewer to select an alternative content option 220. For example, the overlay area 225 may be highlighted or otherwise brought to the attention of the viewer 205 in a like manner. In another exemplary approach, textual or audible messages may announce the presence and purpose of the overlay 225 and the alternative content options 220. If applicable, the prompting may advertise the price or fees associated with selecting the alternative content options 220.

If selected by the viewer, the alternative content option 220 may replace the current content being presented in the content area 215. In one exemplary approach, the system 100 may attempt to generate revenue from the viewer 205 by advertising and up-selling specialty content that is not included with the content subscription or package of the viewer. Advertising specialty content in this manner may provide the operator of the subscriber system with an otherwise rare opportunity to interact with the viewer 205 for the purpose of up-selling content. Moreover, the timing of the overlay 225 is particularly targeted to a period believed to involve likely viewer disinterest 210 in the present content of the content area 215. The specialty content provided as alternative content options 220 may include pay-per-use content (pay-per-view programming, video-on-demand, computer gaming, streaming music and videos), advertisement supported content, and content available through subscription enhancements or upgrades. While most media content is advertisement supported content, the advertiser supported content provided as an alternative content option 220 may include advertisements in which the revenue therefrom is directed to the subscriber system rather than to the producer of the content. For example, rather than charging for computer gaming or movies on a pay-per-use or pay-per-view basis, the content may be provided with accompanying or embedded advertisements.

Figure 3:
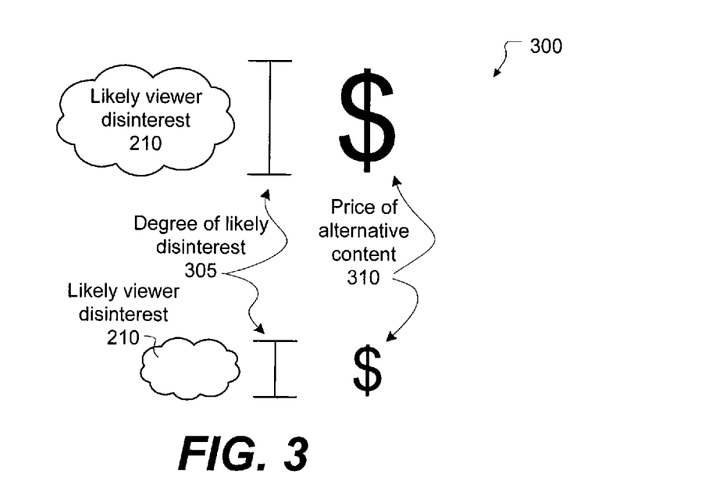
FIG. 3 is a representation of the price of exemplary content options in light of likely viewer disinterest.

FIG. 3 illustrates a diagram representing a price of alternative content options 310 in light of likely viewer disinterest 210. In one exemplary approach, the price 310 may be constant regardless of the amount of likely viewer disinterest 210. However, in another exemplary approach, the system 100 may employ variable pricing for the alternative content options 220. Moreover, the variability may be based on an estimated degree of likely disinterest 305. For example, the price of the alternative content 310 may be discounted from a normal or base price based on the detection of likely viewer disinterest 210, with a greater degree of likely disinterest 305 resulting in a lesser discount. The viewer 205 may be more agreeable to an up-sale and therefore, more willing to pay a high price 310, if there is a high degree of likely disinterest 305. However, when there is only a small degree of likely disinterest 305, the price 310 of the alternative content options 220 may need to be discounted in order to make an up-sale. Techniques for estimating the degree of likely disinterest 305 are addressed with respect to FIGS. 4A-C.

The alternative content options 220 may be displayed in the overlay 225 whenever any amount of likely viewer disinterest 210 is detected. However, in another exemplary approach, the degree of likely disinterest 305 may be compared to a threshold value to determine whether the alternative content options should be overlaid on the content area 215. For example, the alternative content options 220 may only be presented in the overlay 225 if the degree of likely disinterest 305 exceeds a threshold value. As discussed above, the viewer 205 may be prompted to select from the alternative content options 220. In one exemplary approach, the price of the alternative content 310 may be revealed by the prompting. Further, the price 310 may change over time with new prices being presented to the viewer 205 through additional or updated prompting.

The price 310 may increase or decrease over time depending on the revenue generating assumptions and strategy of the system 100. In one exemplary approach, the degree of likely disinterest 305 may increase along with the length of time that the likely viewer disinterest 210 has been detected. As explained above, one strategy assumes that the viewer 205 may be more willing to pay a high price 310, if there is a high degree of likely disinterest 305. Accordingly, the price 310 may increase over time.

However, another strategy may use the length of time that the likely viewer disinterest 210 has been detected for only an initial determination of the price 310. Thereafter, the price 310 may decrease with time regardless of the length of time that the likely viewer disinterest 210 has been detected. Such a strategy may be employed to learn a viewer's willingness to pay for alternative content options 220. However, a floor price or lower bound, may need to be implemented to prevent the viewer 205 from waiting out the clock simply to receive a favorable price. Moreover, the floor price may be varied with each instance that the overlay 225 is displayed to prevent the viewer 205 from identifying pricing patterns as well as to gradually increase the viewer's willingness to pay.

As noted above, the degree of likely disinterest 305 may increase along with the length of time that the likely viewer disinterest 210 has been detected. However, in another exemplary approach, the technique for estimating the degree of likely disinterest 305 may vary based on attributes of the content being presented in the content area 215. For example, attributes of advertising content may include indicia of advertisements 405 (FIG. 4A) for use in estimating the degree of likely disinterest 305. In another exemplary approach, a calculated review rate 455 (FIG. 4B) may be one attribute of rapid review content used to estimate the degree of likely disinterest 305. In a further exemplary approach, a ranking on a preferred content list 480 (FIG. 4C) may be used to estimate a degree of likely disinterest 305. For comparison across content types, the estimated degree of likely disinterest 305 for each type of content (e.g., advertising content, rapid review content, programming guide content, non-preferred content, etc.) may be normalized to a common scheme, e.g., an integer scale of 1-100.

Figure 4A:
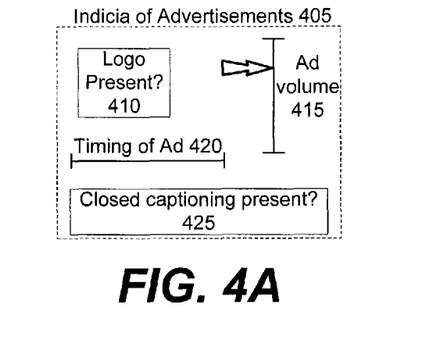
FIG. 4A is a representation of exemplary indicia of advertisement content.

FIG. 4A illustrates exemplary indicia of advertisement content 405. The indicia 405 may be used to both detect likely viewer disinterest and to estimate the degree of the likely disinterest 305. For example, the promotion of a branded product or company in an advertisement may result in the presence of a logo 410. Advertisement content frequently alters the volume 415 from that of the scheduled programming. Typically, the volume 415 may increase suddenly. The timing 420 of the content may allow for the detection of advertising content. For example, programming typically follows a schedule with defined interrupt points and breaks for advertisements. Accordingly, if the timing 420 falls within one of the defined interrupt points or breaks, the content is likely advertising content. The scheduled programming content may include closed captioning 425, or a similar technique to display a running transcription of the audio portion of the content. However, advertising content typically does not include closed captioning 425. Therefore, the lack of closed captioning on its own, or the cessation thereof may be used to detect advertising content.

While each of the indicia of advertisements 405 standing alone provides evidence of the existence of advertising content, the indicia collectively may be input into a confidence score calculation that results in a probability that the current content is advertising content. For example, if the confidence score exceeds a threshold value (e.g., 90 percent) then it may be determined that the current content is advertising content. In one exemplary approach, the confidence score is only used to detect likely viewer disinterest due to the existence of advertising content. However, in another exemplary approach, the confidence score may also provide a basis for estimating the degree of likely disinterest 305.

Rather than using the confidence score, certain indicia 405 individually or in combination may be used to estimate the degree of likely disinterest 305. For example, the volume 415 may directly correlate with the degree of likely disinterest 305 such that a higher volume results in a higher degree of likely disinterest. Also, the timing of the ad 420 with respect to programming schedule may be used to estimate the degree of likely disinterest 305. While it was explained above that the degree of likely disinterest 305 may increase over time, in the case of advertising content, the degree of likely disinterest may vary based on the timing of the ad 420. Because advertising breaks typically follow a defined schedule (e.g., a two minute break eight minutes into the program) the degree of likely disinterest 305 may peak at the onset of the advertisement break and wane near the end of the break. Accordingly, the price 310 of the alternative content options may be greater at the outset of a commercial break and lower at the end of the break.

Figure 4B:
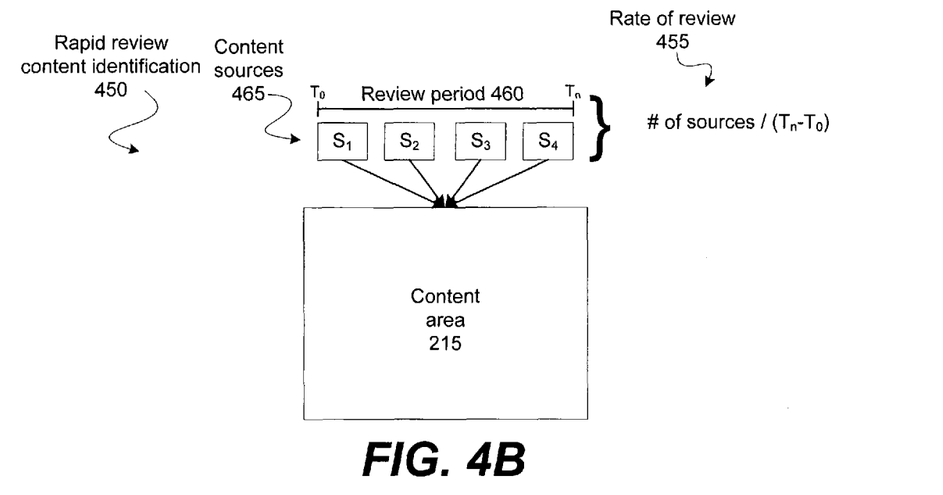
FIG. 4B is an illustrative representation of rapid review content.

FIG. 4B illustrates a representation of rapid review content identification 450. Rapid review content identification 450 may include detecting a change from a first content source 465 to at least a second content source 465 over a review period 460. Content sources 465 may include channels as well as interactive and streaming content delivered outside of a defined channel. For example, the content processing device 104 may be configured to receive multimedia programming content that has been segmented into defined channels by the content distribution network 114. Additionally, the content processing device 104 may receive data and content delivered outside of a defined channel such as videos on demand, interactive gaming, music, and internet content. Further, other devices such as video gaming systems, DVD players, etc., that are unrelated to the media distribution network 114 may provide media feeds to the content processing device 104 that are also considered content sources 465. The review period 460 may be any arbitrary period of time with a starting point $T_0$ and an ending point $T_n$. $T_0$ may be initialized anytime the content source 465 changes. $T_n$ may be a fixed time following $T_0$, e.g., one minute, or may be based on a period of inactivity during which the content source 465 does not change.

A rate of review 455 may be calculated based on the number of detected source 465 changes divided by the review period ($T_n$-$T_0$) 460. If the rate of review 455 falls within a predetermined range, then the content may be identified as rapid review content. For example, if the rate of review 455 is greater than 2 sources per minute but less than 15 sources per minute, the content may be rapid review content. A high rate of review 455 may indicate that the viewer 205 is simply changing between two sources 465 without actually reviewing the intermediary channels. A low rate of review 455 may indicate that the viewer 204 is reviewing the source 465 in detail. Therefore, high and low rates of review 455 may not be useful to detect likely viewer disinterest 210.

Attributes of the rapid review content identification 450 may be used to estimate the degree of likely viewer disinterest 305. In one exemplary approach, the rate of review 455 may provide a basis for the degree of likely viewer disinterest 305. However, in other exemplary approaches, the number of content sources 465 or the length of the review period 460 may provide a basis for the degree of likely viewer disinterest 305. Additionally, the change between two entirely different types of sources 465, e.g., from a television channel to a feed from a DVD player, may be indicative of a high degree of likely viewer disinterest 305.

Figure 4C:
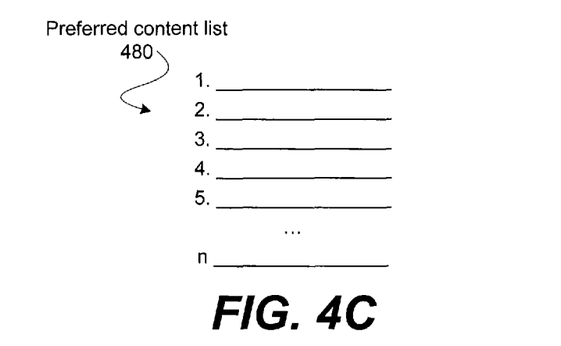
FIG. 4C is an illustrative representation of a preferred content list.

FIG. 4C illustrates a preferred content list 480. The preferred content list 480 may be used to identify non-preferred content by comparing the current multimedia programming content to the items on list 480. Upon concluding that the current multimedia programming content is not included on the list 480, it may be determined that the content is non-preferred content. Accordingly, the preferred content list 480 may act as a so-called white-list of programming content that should not be interrupted with the overlay 225 of alternative content options 220. White-listing media content using the preferred content list 480 may improve customer service by avoiding an interruption with the overlay 225 of any media content in which the viewer 205 has expresses explicit interest. In another exemplary approach (not shown), a so-called black list of programming content in which the viewer 205 will always be disinterested may also be provided.

The content processing device 104 may provide an interface for the viewer 205 to enter multimedia programming content items to the list 480. Additionally, the list 480 may be built or supplemented automatically through periodic inquiries made by the content processing device 104 to the viewer 205. In one exemplary approach, the list may be a ranked list as depicted in FIG. 4c. However in another exemplary approach, the list may include ratings for each content item, e.g., preference ratings on a scale of 1 to 5.

While FIGS. 4A-C depict exemplary techniques for detecting likely viewer disinterest 210, other techniques may also be available. As explained above, the existence of programming guide content in the content area 215 may be used to detect likely viewer disinterest 210. Additionally, the volume level of the media playback device 102 may be used to detect likely viewer disinterest 210. For example, a muted or low volume level may be indicative of the likely viewer disinterest 210. Further, a lack of activity or interaction with the media playback device 102 and the content processing device 104 may be used to detect likely viewer disinterest 210. For example, a lack of change in the content source for a certain period of time, e.g., two hours, may indicate that the media playback device 102 is simply operating in the background with some degree of likely viewer disinterest 305. Also, a lack of change in the content source following the conclusion of a scheduled program may indicate that the viewer 205 left the media playback device set to same content source despite a degree of likely disinterest 305 in the subsequent scheduled programming content. In general, the viewer 205 may have likely disinterest 210 at the outset of any scheduled programming content unless there is evidence to the contrary, such as a recent content source change, or the presence of the content in the preferred content list 480.

Servers 142, 144, and 146, PCs 110a-b, and content processing devices 104a-b may be any general purpose computing device, such as a PC, server, or a specialized device. Servers 142, 144, and 146, PCs 110a-b, and content processing devices 104a-b may have software, such as an operating system in addition to the instructions of module 112 of the content processing devices 104a-b. The operating system may also include a network protocol stack, for establishing network connections, e.g., connections to media distribution network 114 and packet network 118.

Servers 142, 144, and 146, PCs 110a-b, and content processing devices 104a-b may employ any of a number of user-level and embedded operating systems known, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Apple Mac OS X operating system, the Linux operating system, the Symbian mobile device operating system, the Android mobile stack developed by Google, etc. Computing devices may include any one of a number of computing devices known to those skilled in the art, including, without limitation, a computer workstation, a desktop, notebook, laptop, or handheld computer, mobile phones, smart phones, PDAs, or some other computing device known.

Servers 142, 144, and 146, PCs 110a-b, and content processing devices 104a-b may each include instructions executable by one or more processing elements such as those listed above. Computer-executable instructions may be compiled or interpreted from computer programs created using a variety of programming languages and/or technologies known, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 5:
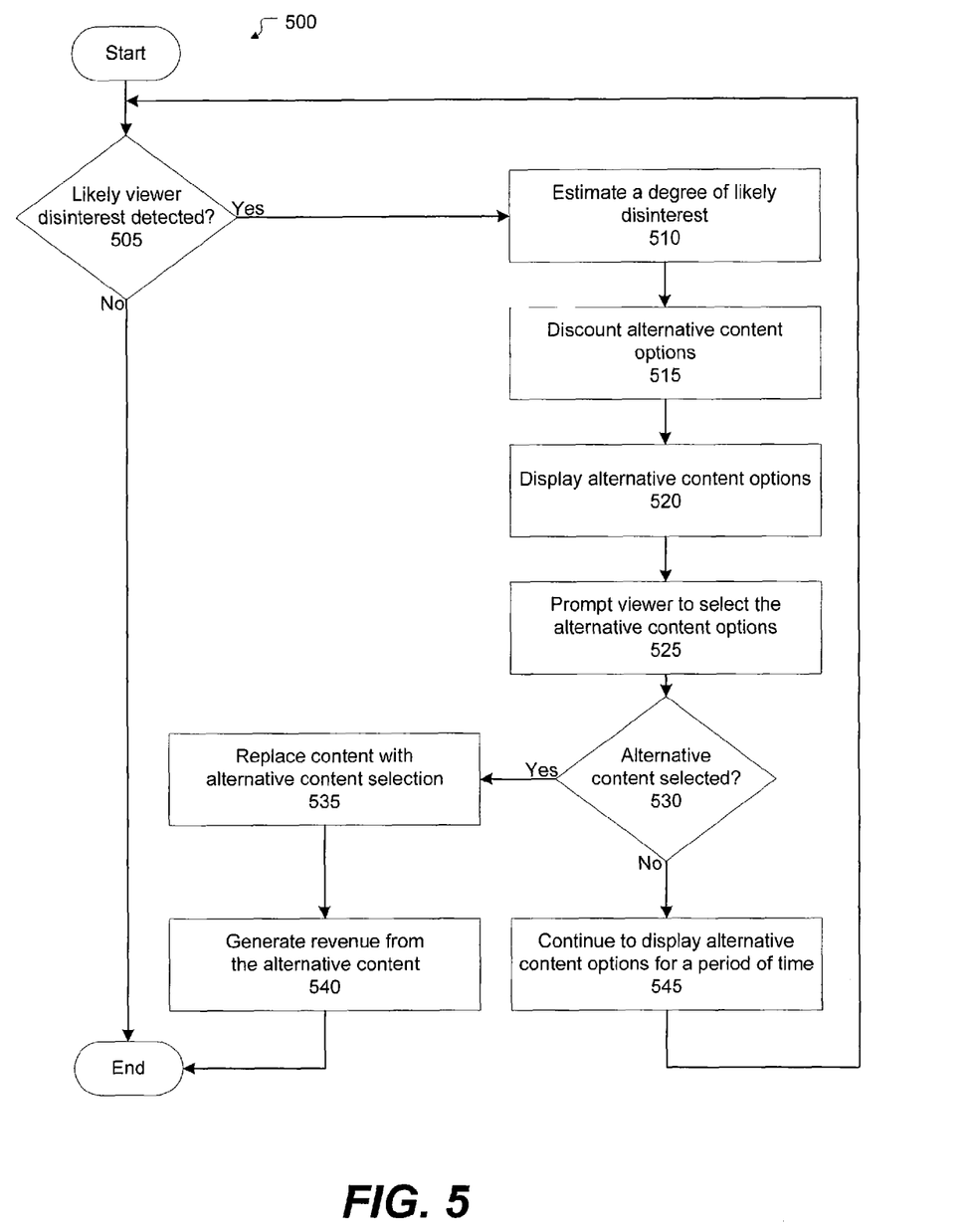
FIG. 5 is a flowchart depicting exemplary steps and decisions related to up-selling alternative content during periods of likely viewer disinterest.

FIG. 5 illustrates a flowchart of an exemplary process 500 for up-selling content during periods of likely viewer disinterest. The content processing devices 104a, 104b may include a computer-readable medium having stored instructions for carrying out certain operations described herein, including some or all of the operations described with respect to process 500. For example, some or all of such instructions may be included in the alternative content module 112. Some steps of process 500 may include user input and interactions. However, it is to be understood that fully automated or other types of programmatic techniques may implement steps that include user input.

The process 500 begins in step 505 in which likely viewer disinterest 210 may be detected. The content being presented to the viewer 205 may be analyzed to judge whether the viewer is likely interested or disinterested therein. For example, the existence of advertising content or programming guide content may indicate that the viewer 205 is likely disinterested. Additionally, the identification of rapid-review content and non-preferred content may indicate that the viewer 205 is likely disinterested. Further details related to detecting likely viewer disinterest 210 are discussed below with respect to FIG. 6. If it is determined that that the viewer is interested in the content, process 500 may end. However, if a threshold level of likely viewer disinterest 210 is detected, the process may proceed to step 510.

Next, in step 510, the degree of likely disinterest 305 may be determined or estimated. In one exemplary approach, the degree of likely disinterest 305 may be based on the length of time that that the likely viewer disinterest 210 has been detected. For example, the degree of likely viewer disinterest 305 may increase over time after the initial detection of likely viewer disinterest 210. However, in context of advertising content, the scheduled and predictable nature of commercial breaks may cause the degree of likely viewer disinterest 305 to peak at the outset of a commercial break and to wane near the conclusion of the break. Accordingly, the degree of likely viewer disinterest 305 may be estimated by consulting a programming schedule to compare where within a commercial break the current time falls. As noted above, other content attributes may also be used to estimate the degree of likely viewer disinterest 305. For example, the estimate may be based on the volume of an advertisement 415, the rate of review 455 of rapid review content, the number of content sources 465 reviewed in rapid review content, the rank or rating of a program on the preferred content list 480.

Next, in step 515, alternative content options 220 may be priced at a discount according to the degree 305 of likely viewer disinterest. As explained above, the price 310 of the alternative content options 220 may vary based on the degree 305 of likely viewer disinterest. A larger degree of likely disinterest 305 may result in a smaller discount. Conversely, a small degree of likely disinterest 305 may require a larger discount to entice the viewer 205 to make a purchase.

Next, in step 520, the alternative content options 220 may be displayed to the viewer 205. In one exemplary approach, the content processing device 104 may present the alternative content options 220 in an overlay 225 of the content area 215. The overlay 225 may present a graphical user interface that the viewer 205 can manipulate and control with a remote control device.

Next, in step 525, the viewer 205 may be prompted to select one of the alternative content options 220. In one exemplary approach, the prompting will occur contemporaneously with the display of the options 220 in step 520. However, in another exemplary approach, there may be a delay between the display in step 520 and the prompting. The prompting may highlight or otherwise call attention to the overlay area 225. A textual or audible message may be presented to explain the available options 220 to the viewer 205. In one exemplary approach, the discounted prices may not be revealed until the prompting. Moreover, the discounted prices may not take effect until the prompting.

Next, in step 530, it may be determined whether one of the alternative content options 220 was selected by the viewer 205. The content processing device 104 may allow the viewer 205 to choose one of the alternative content options 205 displayed in the overlay 225. For example, the content processing device 104a may receive a signal or the like from a viewer 205 operated control device, e.g., a remote control. The overlay 225 may include a user interface including a pointer or selection box that can be manipulated by the remote control to select an alternative content option 220. If the viewer 205 makes a selection the process may proceed to step 535.

In step 535, the current content may be replaced with the selected alternative content option 220. The content processing device 104 may switch the signal being sent to the media play back device 102 form the original content source to the source of the selected alternative content option 220.

Next, in step 540, revenue may be generated from the alternative content option 220. As explained above, the alternative content options 220 may represent specialty content that is not available through the standard content subscription of the viewer 205. For example, the alternative content options 220 may include pay-per-view and pay-per-use movies, videos, music, games, etc. The alternative content options 220 may further include enhancements or upgrades to the subscription of the viewing customer, such as premium content channels. Additionally, the alternative content options 220 may further include advertiser supported content. In one exemplary approach, the selection of a pay-per-view or pay-per-use alternative content option 220 and the offering price 310 thereof may be recorded to the billing and accounting records associated with the viewer 205. In the context of advertiser supported content, the system 100 may increment a view counter for the selected content option 220. The counter may be used for accounting purposes to determine the amount of compensation that the subscriber system will receive from the advertiser. In another exemplary approach, the system 100 may transfer biographical and/or identifying information about the viewer 205 to the advertiser responsible for the advertiser supported content in exchange for a prearranged amount of compensation.

Following a determination in step 530 that an alternative content option 220 was not selected, the options 220 and overlay 225 may be displayed for a period of time in step 545. The period of time should be long enough to allow the viewer 205 to make a selection, but not so long as to annoy the user. Because the viewer 205 may become increasingly disinterested over time, process 500 may return to step 505 to detect whether the viewer 205 is still likely disinterested subsequent to step 545. In one exemplary approach, the parameters used in step 510 to determine the degree 305 of likely viewer disinterest may be preserved to accurately reflect any increase in the degree of likely disinterest. Additionally, the discount calculated in step 515 may be recalculated based on the new degree of likely disinterest 305 in a subsequent iteration if the revenue generating strategy assumes that the viewer will be willing to pay a higher price based on a larger degree of likely disinterest. However, in another exemplary approach, the discount may be increased without regard to any increase in the degree of likely disinterest 305. For example, the discount may be gradually increased over time in order to learn the willingness to pay of the viewer 205.

Following step 540, as well as a determination in step 505 that the viewer 205 is likely interested in the content, process 500 may end.

Figure 6:
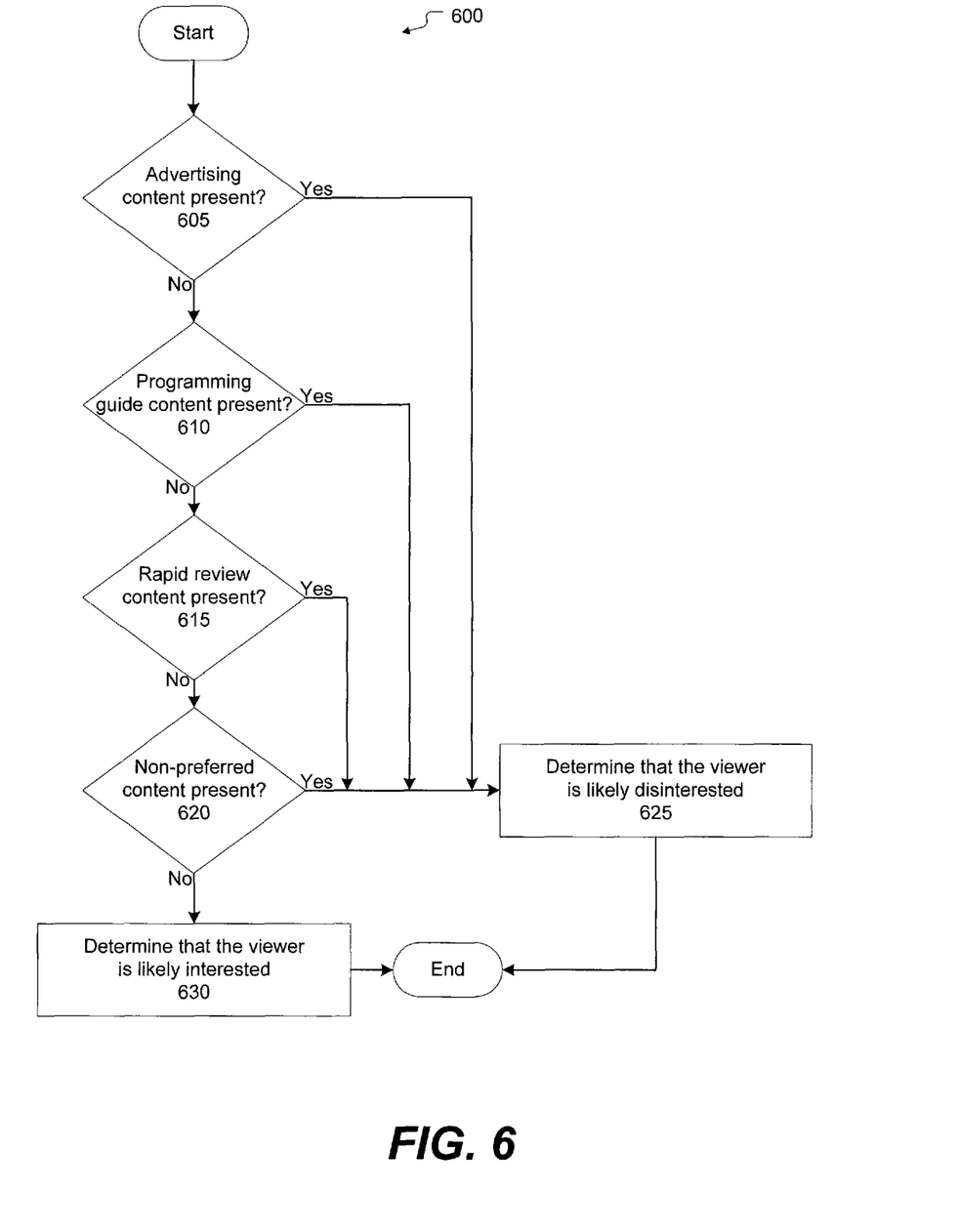
FIG. 6 is a flowchart depicting exemplary steps and decisions related to detecting likely viewer disinterest.

FIG. 6 illustrates a flowchart of an exemplary process 600 for detecting likely viewer disinterest. The steps and decisions of process 600 may be part of the determination of step 505 of process 500. The content processing devices 104a-b may include a computer-readable medium having stored instructions for carrying out certain operations described herein, including some or all of the operations described with respect to process 600. For example, some or all of such instructions may be included in the alternative content module 112.

Process 600 begins in step 605 when it may be determined whether advertising content is present. As discussed above with respect to FIG. 4A, advertising content may include indicia thereof 405. For example, the presence of a logo 410, the ad volume 415, the timing of the ad 420, and the presence of closed captioning 425 may be analyzed individually, or collectively, to determine whether the current content is advertising content. In one exemplary approach, the indicia 455 collectively may be input into a confidence score calculation that results in a probability that the current content is advertising content. In one illustrative approach, if the confidence score exceeds a threshold value (e.g., ninety (90) percent) then it may be determined that the current content is advertising content. If it is determined that advertising content is present, the process may skip to step 625. However, if the current content is not advertising content, the process may proceed to step 610.

In step 610, it may be determined whether programming guide content is present. In one exemplary approach, programming guide content may be provided to the content processing device 104 as a distinct channel of the media distribution network 114. Accordingly, the current channel may be compared to a predetermined guide channel to determine whether programming guide content is present. In another exemplary approach, programming guide content may be provided in a distinct display mode of the content processing device 104 that is activated by the viewer 205 using the remote control. Accordingly, the current display mode may be consulted to determine whether standard media content or programming guide content is currently being presented by content processing device 104. If it is determined that programming guide content is present, the process may skip to step 625. However, if the current content is not programming guide content, the process may proceed to step 615.

In step 615, it may be determined whether rapid review content is present. As discussed above with respect to FIG. 4B, rapid review content identification 450 may include the summing of reviewed content sources 465 over a review period 460. The rate of review may be calculated by dividing the sum by the length of the period 460. Rapid review content may be present if the rate of review 455 falls within a predetermined range, e.g., greater than 2 sources per minute but less than 15 sources per minute. If it is determined that rapid review content is present, the process may skip to step 625. However, if the current content is not rapid review content, the process may proceed to step 620.

In step 620, it may be determined whether non-preferred content is present. In one exemplary approach, the content processing device 104 may maintain a ranked list 480 of preferred content specified by the viewer 205. The current multimedia programming content may be compared with the items on the list to determine if it is preferred or non-preferred. In another exemplary approach, the list 480 may include ratings, e.g., a 1-5 scale, thereby including both preferred and non-preferred content. For example, a high rating would indicate that the content is preferred, while a low rating would indicate that the content is non-preferred. If it is determined that non-preferred content is present, the process may proceed to step 625. However, if the current content is preferred content, the process may proceed to step 630.

In step 625, it may be determined that the viewer is likely disinterested based on any of the determinations of steps 605-620. In one exemplary approach, the detection of any degree of likely disinterest may be sufficient. However, in another exemplary approach, the degree of likely disinterest may need to exceed a threshold level in order to determine that the viewer is likely disinterested. Additionally, the degree of likely disinterest may be based on steps 605-620 individually or collectively. For example, as illustrated, the determination of likely viewer disinterested may be based on steps 605-620 individually. Moreover, a determination that advertising is present in step 605 would render the steps 610-620 irrelevant. However, in another exemplary approach (not shown), the determinations in steps 605-620 may each result in a degree of likely disinterest that is summed to arrive at a total degree of likely disinterest.

In step 630, it may be determined that the viewer is likely interested if none of the determinations of steps 605-620 provide an indication to the contrary. In one exemplary approach, the absolute non-detection of likely viewer disinterest may result in determination that the viewer is in fact likely disinterested. However, in a complimentary manner to step 625, the detection of some degree of likely viewer disinterest may still not result in a determination that the viewer is in fact likely disinterested if the degree does not reach a threshold level. As discussed above in step 625, the steps 605-620 may be considered individually or collectively when determining whether the viewer is likely disinterested.

Following steps 625 and 630, process 600 may end.

Accordingly, an exemplary system 100 for up-selling content during periods of likely viewer disinterest has been described. The system includes a content distribution network 114 that provides content to a content processing device 104 at a customer premises 101. A alternative content module 112 may be configured to detect likely viewer disinterest 210 and present alternative content options 220 to the viewer 205. Content identified as programming guide content, advertising content, rapid review content, non-preferred content, etc. may provide an indication of likely viewer disinterest 210. The price 310 of the alternative content options 220 may be based on an estimated degree of likely disinterest 305. Thus the system 100 may generate revenue through up-selling content that has been offered at a time and price specifically tailored to the existence and degree of likely viewer disinterest 210, 305.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claims.

Accordingly, it is to be understood that the above description is intended to be illustrative and not restrictive. Many systems and applications other than the examples provided would be apparent upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method, comprising:
   automatically identifying, in a computing device having a processor and a memory, while a media content item is being presented to a user, a non-preferred portion of the media content item as including non-preferred content by:
      maintaining a list of preferred programming content items designated by the user,
      comparing the non-preferred portion of the media content item to the list of preferred programming to determine whether the non-preferred portion of the media content item is a programming content item on the list, and
      concluding that the non-preferred portion of the media content item is not a programming content item that is included on the list of preferred programming;
   prompting a selection of alternative content, if non-preferred content is identified; and overlaying at least part of the non-preferred portion of the media content item with the alternative content upon selection.

2. The method according to claim 1, further comprising identifying the non-preferred portion of the media content as at least one of advertising content, and programming guide content.

3. The method according to claim 1, further comprising identifying the portion of the media content as rapid review content including:
  detecting a change from a first content source to at least a second content source over a review period;
  calculating a rate of review based on the number of detected changes over the review period; and
  basing the identifying on the rate of review being within a predetermined range.

4. The method according to claim 1, further comprising generating revenue by presenting at least one of pay-per-use content, advertisement supported content, and subscription based content as the alternative content option.

5. The method according to claim 1, further comprising displaying a plurality of alternative content options in area overlaying at least part of the non-preferred portion of the media content.

6. The method according to claim 1, further comprising providing the alternative content at a discount to its normal price.

7. The method according to claim 6, further comprising basing the discount on an estimated degree of likely viewer disinterest.

8. The method according to claim 1, further comprising:
  estimating a degree of likely viewer disinterest based on a volume change; and
  overlaying the at least one alternative content option on at least part of the non-preferred portion of the media content when the degree exceeds a threshold.

9. A system, comprising:
  a media content distribution network configured to provide a media content item and at least one choice of alternative content;
  a content viewing device; and
  a content processing device for interfacing the viewing device with the media content distribution network configured to:
  automatically identify, while the media content item is being presented to a user, a non-preferred portion of the media content item as including non-preferred content at least by:
    maintaining a list of preferred programming content items designated by a user,
    comparing the non-preferred portion of the media content item to the list of preferred programming to determine whether the non-preferred portion of the media content item is a programming content item on the list of preferred programming, and
    concluding that the non-preferred portion of the media content is not a programming content item that is included on the list of preferred programming;
  prompt for a selection of alternative content; and
  overlay at least part of the non-preferred portion of the media content item with the alternative content upon selection.

10. The system according to claim 9, wherein the content processing device is further configured to identify the non-preferred portion of the media content as at least one of advertising content, and programming guide content.

11. The system according to claim 9, wherein the content processing device is further configured to identify the non-preferred portion of the media content as rapid review content including:
  detecting a change from a first content source to at least a second content source over a review period;
  calculating a rate of review based on the number of detected changes over the review period; and
  basing the identifying on the rate of review being within a predetermined range.

12. The system according to claim 9, wherein the content processing device is further configured to generate revenue by presenting at least one of pay-per-use content, advertisement supported content, and subscription upgrades as the alternative content.

13. The system according to claim 9, wherein the content processing device is further configured to display a plurality of alternative content options in area overlaying the non-preferred portion of the media content.

14. The system according to claim 9, wherein the content processing device is further configured to:
  provide the alternative content at a discount to its normal price; and
  base the discount on an estimated degree of likely viewer disinterest.

15. The method of claim 1, further comprising detecting advertising content in the non-preferred portion of the media content, wherein the alternative content is a game available during the portion of the media content.

16. The method of claim 8, further comprising detecting advertising content in the non-preferred portion of the media content.

17. The system of claim 9, further comprising detecting advertising content in the portion of the media content.

18. A method comprising:
  presenting a media content item to a user;
  automatically identifying, while presenting the media content item to the user, a segment of the media content item as including non-preferred content, with a computing device, by
    maintaining a list of preferred programming content items designated by the user,
    comparing the non-preferred portion of the media content item to the list of preferred programming to determine whether the non-preferred portion of the media content item is a programming content item on the list, and
    concluding that the non-preferred portion of the media content item is not a programming content item that is included on the list of preferred programming;
  embedding, on at least a portion of the media content item, at least one alternative content option during the non-preferred content;
  presenting, on at least the portion of the media content item, the alternative content option in response to a selection of the alternative content during the non-preferred content; and
  removing the alternative content option in response to the computing device detecting that the media content item no longer includes the non-preferred content.

19. The method according to claim 18, wherein the alternative content is a game presented during the non-preferred content.

20. The method according to claim 19, further comprising generating revenue by presenting the game in response to the selection during the non-preferred content.

* * * * *